(12) United States Patent
Zhang et al.

(10) Patent No.: US 12,556,134 B2
(45) Date of Patent: Feb. 17, 2026

(54) PHOTOVOLTAIC FRAME AND PHOTOVOLTAIC MODULE

(71) Applicant: Ruixu Industrial Co., Ltd., Shangrao (CN)

(72) Inventors: Jianping Zhang, Shangrao (CN); He Guan, Shangrao (CN)

(73) Assignee: Ruixu Industrial Co., Ltd., Shangrao (CN)

( * ) Notice: Subject to any disclaimer, the term of this patent is extended or adjusted under 35 U.S.C. 154(b) by 19 days.

(21) Appl. No.: 18/770,733

(22) Filed: Jul. 12, 2024

(65) Prior Publication Data

US 2025/0364945 A1    Nov. 27, 2025

(30) Foreign Application Priority Data

May 24, 2024   (CN) .......................... 202410658071.4

(51) Int. Cl.
*H02S 30/10* (2014.01)
(52) U.S. Cl.
CPC ................... *H02S 30/10* (2014.12)
(58) Field of Classification Search
CPC ....................................................... H02S 30/10
See application file for complete search history.

(56) References Cited

U.S. PATENT DOCUMENTS

| | | | | |
|---|---|---|---|---|
| 2024/0279882 A1* | 8/2024 | Chen | ...................... | E03F 1/005 |
| 2025/0343502 A1* | 11/2025 | Lin | ........................ | H02S 30/10 |

FOREIGN PATENT DOCUMENTS

| | | | |
|---|---|---|---|
| CN | 207099022 U | | 3/2018 |
| CN | 214101238 U | | 8/2021 |
| CN | 214256207 U | | 9/2021 |
| CN | 218449994 | * | 2/2023 |
| CN | 218449994 U | | 2/2023 |
| CN | 116192018 A | | 5/2023 |
| CN | 219351632 U | | 7/2023 |
| CN | 219458996 U | | 8/2023 |
| CN | 117478048 | * | 1/2024 |
| CN | 117478048 A | | 1/2024 |

(Continued)

OTHER PUBLICATIONS

Extended European Search Report in corresponding EP Application No. 24190226.1, dated Jan. 24, 2025, in 98 pgs.

(Continued)

*Primary Examiner* — Jayne L Mershon
(74) *Attorney, Agent, or Firm* — Dority & Manning, PA (57) ABSTRACT

A photovoltaic frame includes: a carrying plate configured to support a backlight surface of a laminate; and a first side plate and a second side plate. The first side plate has a protruding portion protruding from the carrying plate, the protruding portion and the carrying plate enclose a mounting groove. The protruding portion and/or the carrying plate is provided with a glue groove structure, and a side surface of the second side plate away from the first side plate is provided with a glue overflow plate protruding towards in a direction away from the first side plate, the glue overflow plate and the second side plate enclose a first glue overflow groove in communication with the mounting groove, when the laminate is mounted on the photovoltaic frame, a top end of the protruding portion is lower than or coplanar with a light-receiving surface of the laminate.

10 Claims, 9 Drawing Sheets

(56) References Cited

FOREIGN PATENT DOCUMENTS

| | | | |
|---|---|---|---|
| CN | 220527975 U | | 2/2024 |
| CN | 220711424 | * | 4/2024 |
| CN | 220711424 U | | 4/2024 |
| CN | 220711425 U | | 4/2024 |
| CN | 220964774 U | | 5/2024 |
| JP | 2013258265 A | | 12/2013 |
| WO | WO 2024/037111 A1 | | 2/2024 |

OTHER PUBLICATIONS

Office Action received in corresponding Application No. 2024174596, dated May 21, 2025, 8 pages.

* cited by examiner

FIG. 1

(Prior Art)

PHOTOVOLTAIC FRAME AND PHOTOVOLTAIC MODULE

CROSS-REFERENCE TO RELATED APPLICATIONS

This application claims all benefits to Chinese Patent Application No. 2024106580714, filed on May 24, 2024, the contents of which are hereby incorporated by reference.

TECHNICAL FIELD

The present disclosure relates to the field of photovoltaic module technologies, and in particular to a photovoltaic frame and a photovoltaic module.

BACKGROUND

Photovoltaic module generally includes a photovoltaic laminate and a photovoltaic frame configured to mount the laminate. As an important part of the photovoltaic module, the photovoltaic frame plays a role in fixing and sealing the laminate and facilitating transportation and mounting of the photovoltaic module. A frame structure of the photovoltaic module has a great impact on mounting and a service life of the photovoltaic module.

Figure 1:
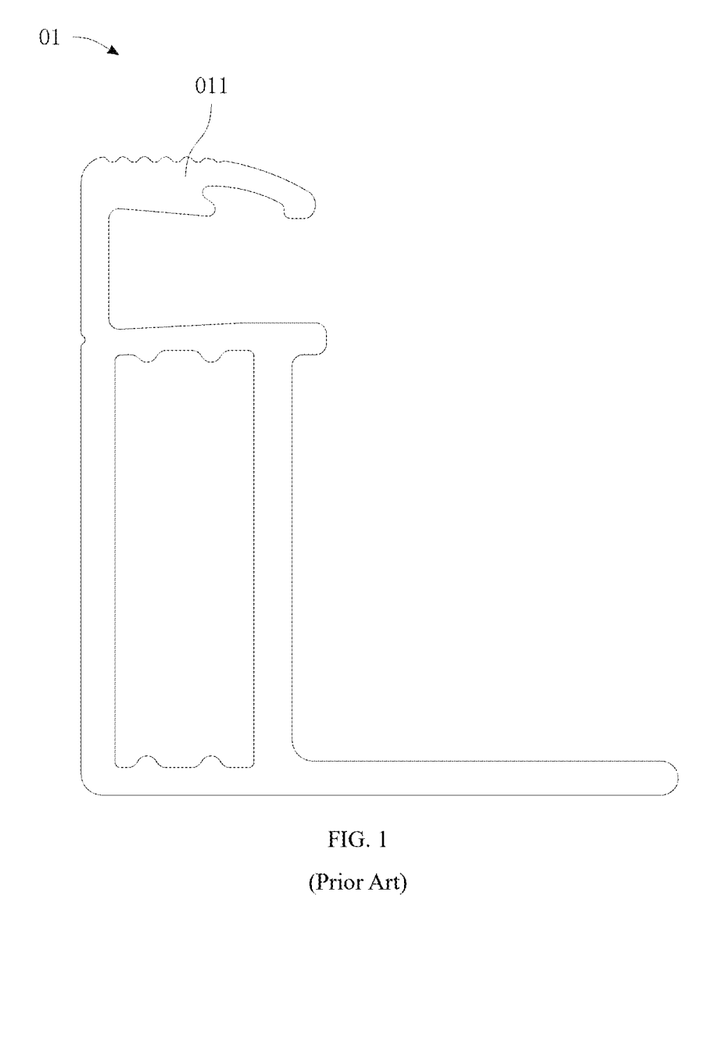
FIG. 1 is a schematic sectional view of a photovoltaic frame in some prior arts.

A conventional photovoltaic frame 01 is a C-shaped member with laminates fixed on three sides. As shown in FIG. 1, the photovoltaic frame generally has a structure of a side A 011. When the laminate is mounted on this photovoltaic frame, the side A may be above a light-receiving surface of the laminate. Due to the blocking of the side A, more dust may be accumulated on the laminate during long-time use, after natural rinsing of rain, dew, and the like, the dust may be scoured to a region of the laminate adjacent to the side A, resulting in undesirable phenomena such as water accumulation and dust accumulation on the light-receiving surface of the laminate. In order to reduce the blocking effect of the photovoltaic frame on the laminate, a photovoltaic frame designed with the structure of the side A removed has appeared on the market. However, this frame structure has insufficient gluing strength for the laminate, and during the gluing of the laminate, an adhesive easily overflows to a surface of the laminate, which has a blocking effect on the surface of the laminate and affects an appearance.

SUMMARY

Accordingly, it is necessary to provide a photovoltaic frame and a photovoltaic module to address the problems that when the laminate is mounted on the photovoltaic frame, the light-receiving surface of the conventional laminate is prone to undesirable phenomena such as water accumulation and dust accumulation, and the photovoltaic frame has insufficient gluing strength for the laminate.

A photovoltaic frame is configured to mount a laminate, wherein the photovoltaic frame includes: a carrying plate configured to support a backlight surface of the laminate; and a first side plate and a second side plate that are respectively connected to two opposite sides of the carrying plate, wherein the first side plate has a protruding portion protruding from the carrying plate, the protruding portion and the carrying plate enclose a mounting groove configured to accommodate the laminate, the protruding portion and/or the carrying plate is provided with a glue groove structure in communication with the mounting groove, and a side surface of the second side plate away from the first side plate is provided with a glue overflow plate protruding towards in a direction away from the first side plate, the glue overflow plate and the second side plate enclose a first glue overflow groove in communication with the mounting groove, wherein when the laminate is mounted on the photovoltaic frame, a top end of the protruding portion is lower than or coplanar with a light-receiving surface of the laminate.

In an embodiment, the carrying plate has a carrying surface configured to support the laminate; wherein an end portion of the protruding portion away from the carrying plate is bent to form a glue blocking plate protruding towards an interior of the mounting groove, the glue blocking plate, the protruding portion, and the carrying plate enclose a second glue overflow groove in communication with the mounting groove, the glue blocking plate has a first end connected to the protruding portion, a second end extending to the interior of the mounting groove, and a transition surface connecting the first end and the second end, the transition surface is an inclined surface or a curved surface and is located on a side of the glue blocking plate adjacent to the carrying plate; wherein in a protruding direction of the protruding portion, a distance from a junction of the transition surface and the first end to the carrying surface is H1, a distance from a junction of the transition surface and the second end to the carrying surface is H2, and H1>H2.

In an embodiment, the protruding portion is provided with at least one first protrusion on a side surface of one side adjacent to the mounting groove, the first protrusion, the glue blocking plate, and the protruding portion enclose the second glue overflow groove; the first protrusion, the carrying plate, and the protruding portion also enclose the second glue overflow groove; wherein when a plurality of first protrusions are provided, two adjacent first protrusions and the protruding portion also enclose the second glue overflow groove.

In an embodiment, the carrying plate is provided with a plurality of second protrusions on an end face of one side adjacent to the mounting groove, two adjacent second protrusions and the carrying plate enclose a third glue overflow groove in communication with the mounting groove.

In an embodiment, the glue overflow plate comprises a glue holding portion and a support portion bent and formed at an end portion of the glue holding portion, a side of the glue holding portion away from the support portion is connected to the second side plate and protrudes towards one side away from the first side plate, the support portion extends towards a protruding direction of the protruding portion, and the support portion, the second side plate, and the glue holding portion enclose the first glue overflow groove; wherein when the laminate is mounted on the photovoltaic frame, the backlight surface of the laminate abuts against an end portion of a side of the support portion away from the glue holding portion.

In an embodiment, the photovoltaic frame further includes a reinforcing plate, wherein two sides of the reinforcing plate are respectively connected to surfaces of the second side plate and the glue holding portion away from the mounting groove, so as to support the glue overflow plate.

In an embodiment, the glue overflow plate further comprises a glue collecting portion connected to an end portion of the support portion away from the glue holding portion, the glue collecting portion protrudes in a direction towards one side adjacent to the first side plate, a glue passing opening is provided between the glue collecting portion and the second side plate, and the glue passing opening is in communication with both the first glue overflow groove and the mounting groove.

In an embodiment, the photovoltaic frame further includes a limiting plate provided on an end portion of the photovoltaic frame extending along a length direction, wherein the limiting plate has an abutment surface; and when the laminate is mounted on the photovoltaic frame, two adjacent sidewalls of the laminate are in contact with the protruding portion and the abutment surface, respectively.

In an embodiment, the first side plate, the second side plate, and the carrying plate extend lengthwise along the length direction of the photovoltaic frame; wherein the limiting plate is provided on one side of the first side plate adjacent to an end portion along an extension direction thereof, or the limiting plate is provided on one side of the carrying plate adjacent to an end portion along an extension direction thereof, wherein the limiting plate is sealed at an end portion of the glue groove structure along the length direction of the photovoltaic frame.

A photovoltaic module includes: a laminate; and the photovoltaic frame as described in any one of the above technical solutions, and the laminate being mounted on the photovoltaic frame.

In an embodiment, the laminate includes a long side and a short side, and at least one of the long side and the short side is connected to the photovoltaic frame.

According to the photovoltaic frame and the photovoltaic module above, when the laminate is required to be mounted on the photovoltaic frame, a preset amount of adhesive can be filled in the glue groove structure and the first glue overflow groove, and the laminate is glued and fixed in the mounting groove through the adhesive, thereby achieving fixing and mounting of the laminate on the photovoltaic frame. According to the photovoltaic frame provided in the present disclosure, when the laminate is mounted on the photovoltaic frame, the top end of the protruding portion is lower than or coplanar with the light-receiving surface of the laminate, that is, the light-receiving surface of the laminate is not lower than the top end of the protruding portion. The dust accumulated on the light-receiving surface of the laminate can be smoothly discharged from the laminate under natural scouring of rain, dew, and the like, which may not cause undesirable phenomena such as water accumulation and dust accumulation on the light-receiving surface of the laminate. The photovoltaic frame may not shield the light-receiving surface of the laminate, which can improve power generation efficiency of the laminate and effectively prevent hot spots in the laminate. In addition, through fitting of the first glue overflow groove with the glue groove structure, a glue holding capacity of the adhesive can be increased, and gluing strength of the laminate on the photovoltaic frame can be improved. Moreover, when the laminate squeezes the adhesive in the glue groove structure during the mounting to cause the adhesive in the glue groove structure to overflow, the first glue overflow groove can receive the glue overflowing from the glue groove structure, thereby preventing overflowing of the adhesive to the backlight surface of the laminate. Besides, the glue overflow plate can support the laminate, which can effectively prevent undesirable phenomena such as deformation and even breakage of the photovoltaic frame during long-term fixing of the laminate, thereby prolonging the service life of the photovoltaic frame.

REFERENCE SIGNS

100: photovoltaic frame;
110: carrying plate; 111: carrying surface; 112: second protrusion; 120: first side plate; 121: protruding portion; 122: glue blocking plate; 1221: first end; 1222: second end; 1223: transition surface; 123: first protrusion; 130: second side plate; 131: glue overflow plate; 1311: glue holding portion; 1312: support portion; 1313: glue collecting portion; 1314: glue passing opening; 132: first glue overflow groove; 140: mounting groove; 150: glue groove structure; 151: second glue overflow groove; 152: third glue overflow groove; 160: limiting plate; 161: abutment surface; 170: reinforcing plate; 180: bottom plate; 190: cavity;
200: laminate; 210: backlight surface; 220: light-receiving surface;
300: gluing layer.
400: photovoltaic module.

DETAILED DESCRIPTION

In order to make the above objectives, features and advantages of the present disclosure more obvious and understandable, specific implementations of the present disclosure are described in detail below with reference to the accompanying drawings. In the following description, many specific details are set forth in order to fully understand the present disclosure. However, the present disclosure can be implemented in many other ways different from those described herein, and those skilled in the art can make similar improvements without departing from the connotation of the present disclosure. Therefore, the present disclosure is not limited by specific embodiments disclosed below.

In the description of the present disclosure, it is to be understood that if the terms "central", "longitudinal", "transverse", "length", "width", "thickness", "upper", "lower", "front", "back", "left", "right", "vertical", "horizontal", "top", "bottom", "inner", "outer", "clockwise", "counterclockwise", "axial", "radial", "circumferential", and the like appear, the orientation or position relationships indicated by the terms are based on the orientation or position relationships shown in the accompanying drawings and are intended to facilitate the description of the present disclosure and simplify the description only, rather than indicating or implying that the apparatus or element referred to must have a particular orientation or be constructed and operated in a particular orientation, and therefore are not to be interpreted as limiting the present disclosure.

In addition, the terms "first" and "second" are used for descriptive purposes only, which cannot be construed as indicating or implying a relative importance, or implicitly specifying the number of the indicated technical features. Therefore, the features defined with "first" and "second" may explicitly or implicitly include at least one feature. In the description of the present disclosure, the term "a plurality of" means at least two, such as two or three, unless otherwise defined explicitly and specifically.

In the present disclosure, unless otherwise specified and defined explicitly, the terms "mount", "connect", "join", and "fix" should be understood in a broad sense, which may be, for example, a fixed connection, a detachable connection, or an integral connection; a mechanical connection or an electrical connection; or a direct connection, an indirect connection via an intermediate medium, an internal connection between two elements, or interaction between two elements. Those of ordinary skill in the art can understand specific meanings of these terms in the present disclosure according to specific situations.

In the present disclosure, unless otherwise explicitly specified and defined, the expression a first feature being "on" or "under" a second feature may be the case that the first feature is in direct contact with the second feature, or the first feature is in indirect contact with the second feature via an intermediate medium. Furthermore, the expression the first feature being "over", "above" and "on top of" the second feature may be the case that the first feature is directly above or obliquely above the second feature, or only means that the level of the first feature is higher than that of the second feature. The expression the first feature being "below", "underneath" or "under" the second feature may be the case that the first feature is directly underneath or obliquely underneath the second feature, or only means that the level of the first feature is lower than that of the second feature.

It is to be noted that when one element is referred to as being "fixed to" or "arranged on" another element, it may be directly disposed on the other element or an intermediate element may exist. When one element is considered to be "connected to" another element, it may be directly connected to the other element or an intermediate element may co-exist. The terms "vertical", "horizontal", "upper", "lower", "left", "right", and similar expressions used in the present disclosure are for illustrative purposes only and do not represent an only implementation.

The technical solutions provided in the embodiments of the present disclosure are introduced below with reference to the accompanying drawings.

Referring to FIG. 1, a conventional photovoltaic frame 01 is a C-shaped member having three sides for fixing a laminate. The photovoltaic frame 01 generally has a structure of a side A 011. When the laminate is mounted on this type of the photovoltaic frame 01, the side A 011 may be higher than a light-receiving surface (top surface) of the laminate. Due to the blocking effect of the side A 011, some dust may be accumulated on the laminate during long-time use. After natural rinsing of rain, dew, and the like, the dust may be scoured to a region of the laminate adjacent to the side A 011, resulting in undesirable phenomena such as water accumulation and dust accumulation on the light-receiving surface of the laminate. As a result, the light-receiving surface of the laminate is shielded, which reduces power generation efficiency of the photovoltaic module and even causes hot spots.

Figure 2:
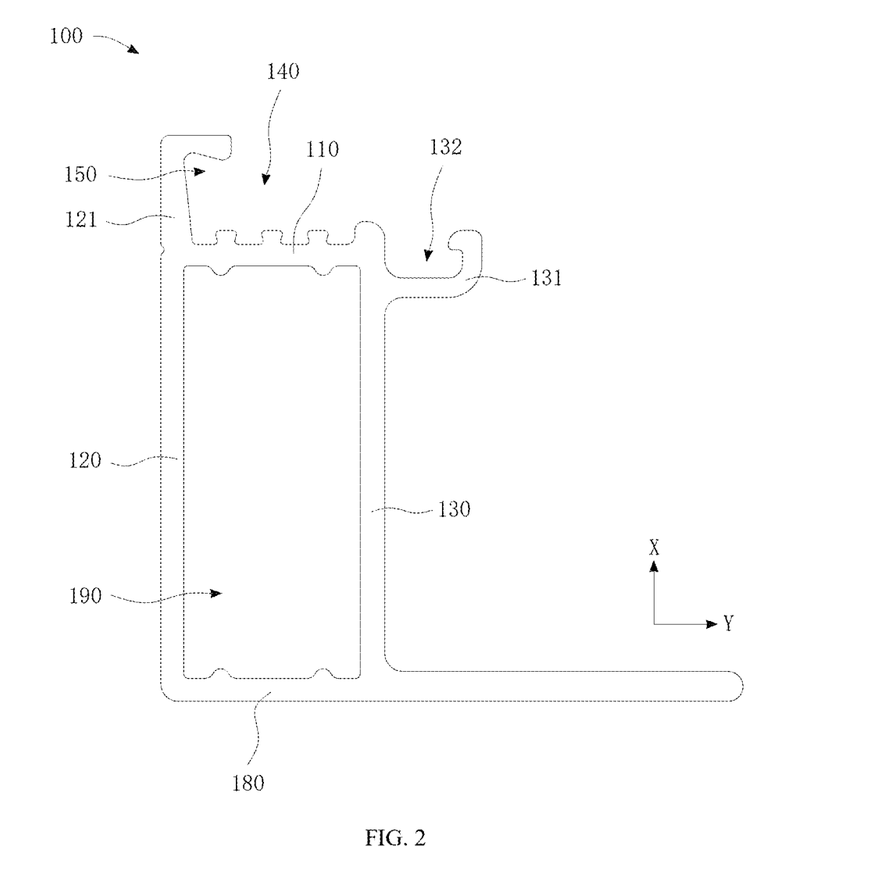
FIG. 2 is a schematic sectional view of a photovoltaic frame according to some embodiments of the present disclosure.
Figure 3:
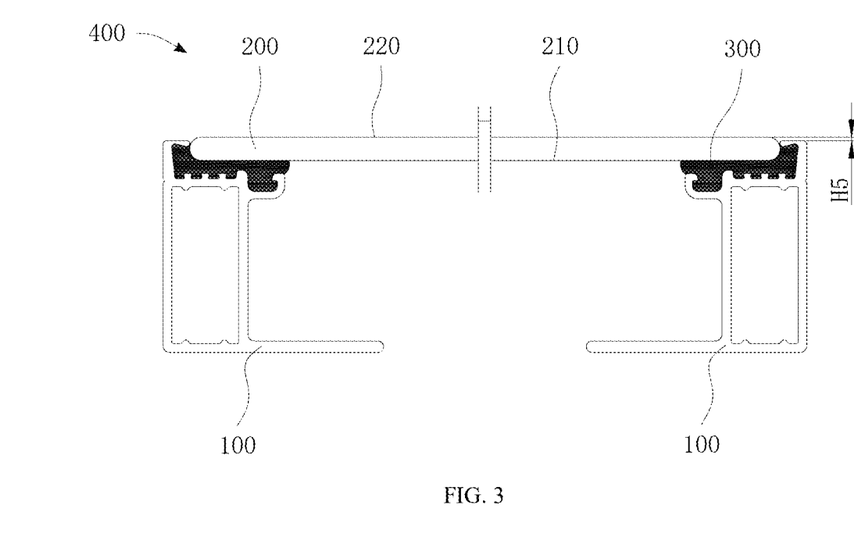
FIG. 3 is a schematic sectional view of a photovoltaic module according to some embodiments of the present disclosure.

In order to address the above problems, referring to FIG. 2 and FIG. 3, an embodiment of the present disclosure provides a photovoltaic frame 100. The photovoltaic frame 100 includes a carrying plate 110, a first side plate 120, and a second side plate 130. The photovoltaic frame 100 is configured to mount a laminate 200. The carrying plate 110 is configured to support a backlight surface 210 of the laminate 200. For example, the backlight surface 210 of the laminate 200 is at least partially placed on the carrying plate 110, so as to achieve mounting and fixing of the laminate 200 by the photovoltaic frame 100.

The first side plate 120 and the second side plate 130 are connected to two opposite sides of the carrying plate 110, respectively. The first side plate 120 has a protruding portion 121 protruding from the carrying plate 110. For example, the first side plate 120, the second side plate 130, and the carrying plate 110 are all constructed to extend lengthwise along a length direction of the photovoltaic frame 100. That is, referring to FIG. 2, the first side plate 120, the second side plate 130, and the carrying plate 110 all extend in a direction perpendicular to a paper surface, while the protruding portion 121 protrudes towards a vertical direction or a substantially vertical direction of the paper surface. The protruding portion 121 and the carrying plate 110 enclose a mounting groove 140, which is configured to accommodate the laminate 200. For example, the laminate 200 is substantially rectangular and has two long sides and two short sides, and the long sides and/or the short sides of the laminate 200 may be accommodated in the mounting groove 140 and connected to the photovoltaic frame 100. The protruding portion 121 and/or the carrying plate 110 is provided with a glue groove structure 150 in communication with the mounting groove 140. The glue groove structure 150 may be configured to fill and accommodate an adhesive (such as silica gel). A side surface of the second side plate 130 away from the first side plate 120 is provided with a glue overflow plate 131. The glue overflow plate 131 protrudes towards a direction away from the first side plate 120. In this embodiment, referring to FIG. 2, the glue overflow plate 131 is constructed to extend lengthwise along the length direction of the photovoltaic frame 100, and the glue overflow plate 131 protrudes towards the horizontal direction or the substantially horizontal direction of the paper surface. The glue overflow plate 131 and the second side plate 130 enclose a first glue overflow groove 132. The first glue overflow groove 132 is in communication with the mounting groove 140. When the laminate 200 is required to be mounted on the photovoltaic frame 100, a preset amount of adhesive can be filled in the glue groove structure 150 and the first glue overflow groove 132, and after the adhesive is cured to form a gluing layer 300, the laminate 200 is glued and fixed in the mounting groove 140 by the gluing layer 300, thereby achieving fixing and mounting of the laminate 200 on the photovoltaic frame 100.

When the laminate 200 is mounted on the photovoltaic frame 100, a top end of the protruding portion 121 is lower than or coplanar with a light-receiving surface 220 of the laminate 200, that is, the light-receiving surface 220 of the laminate 200 is not lower than the top end of the protruding portion 121. The dust accumulated on the light-receiving surface 220 of the laminate 200 can be smoothly discharged from the laminate 200 under natural scouring of rain, dew, and the like, which may not cause undesirable phenomena such as water accumulation and dust accumulation on the light-receiving surface 220 of the laminate 200. The photovoltaic frame 100 may not shield the light-receiving surface 220 of the laminate 200, which can improve power generation efficiency of the laminate 200 and effectively prevent hot spots in the laminate 200.

According to the photovoltaic frame 100, through fitting of the first glue overflow groove 132 with the glue groove structure 150, a glue holding capacity of the adhesive can be increased, and gluing strength of the laminate 200 on the photovoltaic frame 100 can be improved. Moreover, when the laminate 200 squeezes the adhesive in the glue groove structure 150 during the mounting to cause the adhesive in the glue groove structure 150 to overflow, the first glue overflow groove 132 can receive the glue overflowing from the glue groove structure 150, thereby preventing overflowing of the adhesive to the backlight surface 210 of the laminate 200. Besides, the glue overflow plate 131 can support the laminate 200, which can effectively prevent undesirable phenomena such as deformation and even breakage of the photovoltaic frame 100 during long-term fixing of the laminate 200, thereby prolonging the service life of the photovoltaic frame 100.

Referring to FIG. 2 and FIG. 3, when the top end of the protruding portion 121 is lower than the light-receiving surface 220 of the laminate 200, in a thickness direction of the laminate 200, the light-receiving surface 220 of the laminate 200 is higher the top end of the protruding portion 121 by a distance less than or equal to 20 mm, that is, H5≤20 mm shown in FIG. 3. For example, H5 may be any one of 0.1 mm, 5 mm, 10 mm, 15 mm, and 20 mm. The specific value of H5 is not limited herein, which may be selectively set according to a thickness of the laminate 200. It is to be noted that if the light-receiving surface 220 of the laminate 200 is higher the top end of the protruding portion 121 by an excessively large distance, the laminate 200 may easily slide out of the mounting groove 140.

Figure 4:
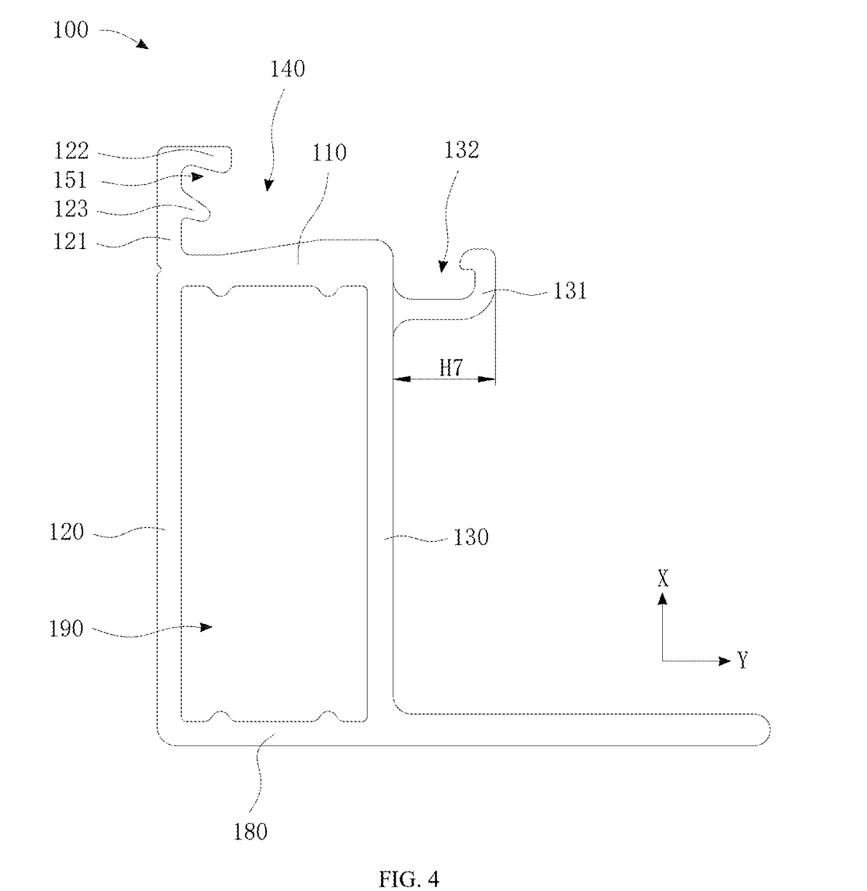
FIG. 4 is a schematic sectional view of a photovoltaic frame according to some embodiments of the present disclosure.

In an embodiment, referring to FIG. 2 to FIG. 4, an end portion of the protruding portion 121 away from the carrying plate 110 is bent to form a glue blocking plate 122. The glue blocking plate 122 protrudes towards an interior of the mounting groove 140, and the glue blocking plate 122, the protruding portion 121, and the carrying plate 110 cooperatively enclose a second glue overflow groove 151, which is in communication with the mounting groove 140. The second glue overflow groove 151 may be configured to accommodate the adhesive, and the second glue overflow groove 151 is in communication with the mounting groove 140. When the laminate 200 is required to be fixed to the photovoltaic frame 100, the adhesive in the second glue overflow groove 151 may flow into the mounting groove 140 to glue and fix the laminate 200 to the photovoltaic frame 100. Moreover, the glue blocking plate 122 is bent and formed on the protruding portion 121, so that the adhesive in the second glue overflow groove 151 can be accommodated in the second glue overflow groove 151 as much as possible, which can prevent a poor appearance of the photovoltaic frame 100 and/or the laminate 200 due to overflowing of the adhesive in the second glue overflow groove 151 to the outside during the squeezing, and can ensure that the adhesive in the second glue overflow groove 151 is used as much as possible to glue the laminate 200, thereby improving the gluing strength of the laminate 200 on the photovoltaic frame 100.

Figure 5:
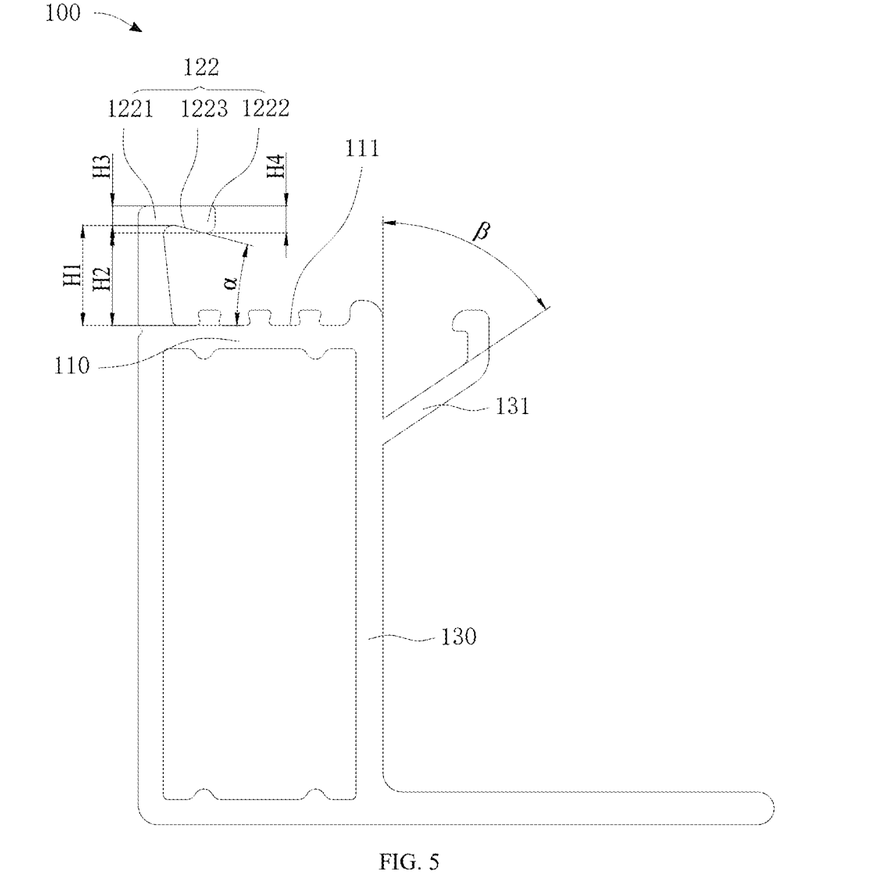
FIG. 5 is a schematic sectional view of a photovoltaic frame according to some embodiments of the present disclosure.
Figure 6:
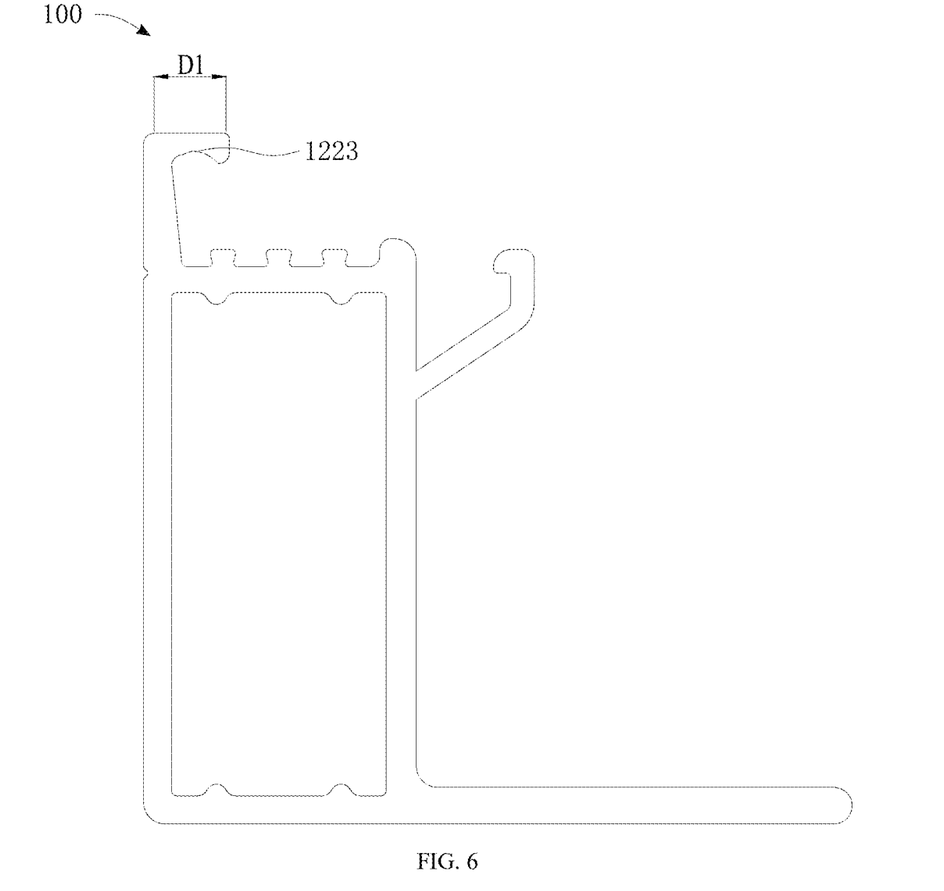
FIG. 6 is a schematic sectional view of a photovoltaic frame according to some embodiments of the present disclosure.

Still referring to FIG. 4 and FIG. 5, the carrying plate 110 has a carrying surface 111 configured to support the laminate 200. The glue blocking plate 122 has a first end 1221, a second end 1222, and a transition surface 1223. The first end 1221 of the glue blocking plate 122 is connected to the protruding portion 121, the second end 1222 of the glue blocking plate 122 extends to the interior of the mounting groove 140, and the transition surface 1223 connects the first end 1221 and the second end 1222. Referring to FIG. 6, a length of the second end 1222 extending to the interior of the mounting groove 140 is defined as D1, and 1 mm≤D1≤10 mm. For example, D1 may be any one of 1 mm, 3 mm, 5 mm, 8 mm, and 10 mm. The specific value of D1 is not limited herein. The transition surface 1223 is located on a side of the glue blocking plate 122 adjacent to the carrying plate 110. That is, the transition surface 1223 faces the carrying surface 111. In a protruding direction of the protruding portion 121, a distance from a junction of the transition surface 1223 and the first end 1221 to the carrying surface 111 is H1, a distance from a junction of the transition surface 1223 and the second end 1222 to the carrying surface 111 is H2, and H1>H2. In other words, referring to FIG. 5, the junction of the transition surface 1223 and the first end 1221 is located above the junction of the transition surface 1223 and the second end 1222. That is, the transition surface 1223 has a tendency to be higher on the left and lower on the right in a horizontal direction, so that an outer contour of the second glue overflow groove 151 is in a shape of a barb, which can prevents the adhesive in the second glue overflow groove 151 from overflowing to the outside during the squeezing, which results in a poor appearance of the photovoltaic frame 100 and/or the laminate 200, and ensure that the adhesive in the second glue overflow groove 151 is used as much as possible to glue the laminate 200, thereby improving the gluing strength of the laminate 200 on the photovoltaic frame 100.

In this embodiment, a surface of a side of the glue blocking plate 122 away from the carrying plate 110 is parallel to the carrying surface 111. When the laminate 200 is mounted on the photovoltaic frame 100, the surface of the side of the glue blocking plate 122 away from the carrying plate 110 is lower than or coplanar with the light-receiving surface 220 of the laminate 200, so that the photovoltaic frame 100 may not shield the light-receiving surface 220 of the laminate 200. Moreover, in the protruding direction of the protruding portion 121, a thickness of the first end 1221 is H3, a thickness of the second end 1222 is H4, and 0.2H4≤H3≤0.8H4, so that H1>H2, thereby ensuring that the outer contour forming the second glue overflow groove 151 is in the shape of a barb. For example, 0.5 mm≤H3≤10 mm. For example, H3 may be any one of 0.5 mm, 2 mm, 5 mm, 7 mm, and 10 mm. 1 mm≤H4≤20 mm. For example, H4 may be any one of 1 mm, 5 mm, 10 mm, 15 mm, and 20 mm. Specific values of H3 and H4 are not limited herein. In an embodiment, referring to FIG. 5, the transition surface 1223 is an inclined surface. An angle between the transition surface 1223 and the carrying surface 111 is defined as α, and 0<α<90°. For example, a may be any one of 15°, 30°, 45°, 60°, and 75°. The specific value of a is not limited herein. In another embodiment, referring to FIG. 6, the transition surface 1223 may be a curved surface, and the transition surface 1223 has a tendency to be higher on the left and lower on the right in the horizontal direction. In another embodiment, referring to FIG. 2 to FIG. 4, the protruding portion 121 is provided with at least one first protrusion 123 on a side surface of one side adjacent to the mounting groove 140. The first protrusion 123, the glue blocking plate 122, and the protruding portion 121 enclose the second glue overflow groove 151, and the first protrusion 123 and the carrying plate 110 also enclose the second glue overflow groove 151. When a plurality of first protrusions 123 are provided, two adjacent first protrusions 123 and the protruding portion 121 also enclose the second glue overflow groove 151. In this way, the structural strength of the protruding portion 121 can be improved through the first protrusion 123, and a plurality of second glue overflow grooves 151 may be formed on the photovoltaic frame 100. The plurality of second glue overflow grooves 151 may be configured to accommodate the adhesive, thereby increasing a glue holding capacity of the adhesive and improving the gluing strength of the laminate 200 on the photovoltaic frame 100.

In yet another embodiment, referring to FIG. 2 to FIG. 4 and FIG. 7, the carrying plate 110 is provided with a plurality of second protrusions 112 on an end face of one side adjacent to the mounting groove 140. Two adjacent second protrusions 112 and the carrying plate 110 enclose a third glue overflow groove 152, which is in communication with the mounting groove 140. The third glue overflow groove 152 may be configured to accommodate the adhesive, and the third glue overflow groove 152 is in communication with the mounting groove 140. When the laminate 200 is required to be fixed to the photovoltaic frame 100, the adhesive in the third glue overflow groove 152 may flow into the mounting groove 140 to glue and fix the laminate 200 to the photovoltaic frame 100. Moreover, the third glue overflow groove 152, the second glue overflow groove 151, and the first glue overflow groove 132 can further increase the glue holding capacity of the adhesive, thereby improving the gluing strength of the laminate 200 on the photovoltaic frame 100.

Figure 7:
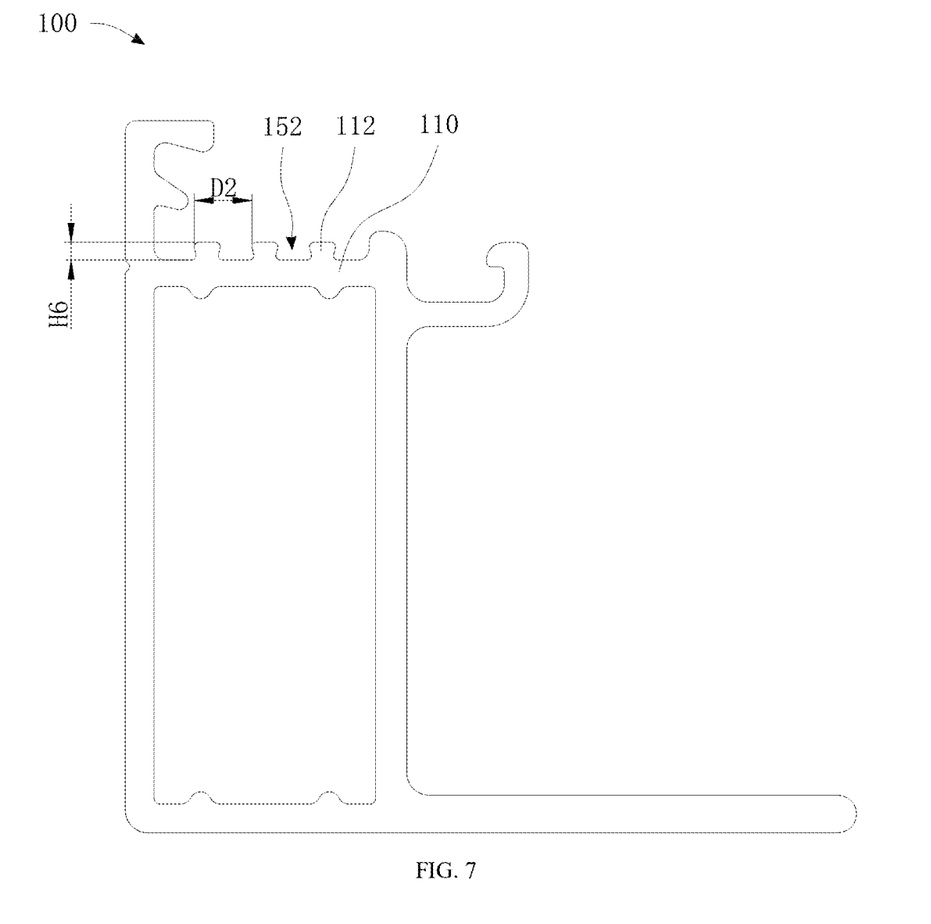
FIG. 7 is a schematic sectional view of a photovoltaic frame according to some embodiments of the present disclosure.

Referring to FIG. 7, a height H6 of the second protrusion 112 protruding from the carrying plate 110 ranges from 0.1 mm to 10 mm, and a distance D2 between two adjacent second protrusions 112 ranges from 0.5 mm to 10 mm. For example, 0.1 mm≤H6≤10 mm, and 0.5 mm≤D2≤10 mm. For example, H6 may be any one of 0.1 mm, 2 mm, 5 mm, 7 mm, and 10 mm, and D2 may be any one of 0.5 mm, 2 mm, 5 mm, 7 mm, and 10 mm. Specific values of H6 and D2 are not limited herein. In this embodiment, when the laminate 200 is mounted on the photovoltaic frame 100, the backlight surface 210 of the laminate 200 may be placed on the second protrusion 112. Since the height of the second protrusion 112 protruding from the carrying plate 110 is limited to the range of 0.1 mm to 10 mm, it is ensured that the second protrusion 112 has sufficient support strength for the laminate 200. By limiting the spacing between two adjacent second protrusions 112 to the range of 0.5 mm to 10 mm, the structural strength of the carrying plate 110 can be ensured.

Figure 8:
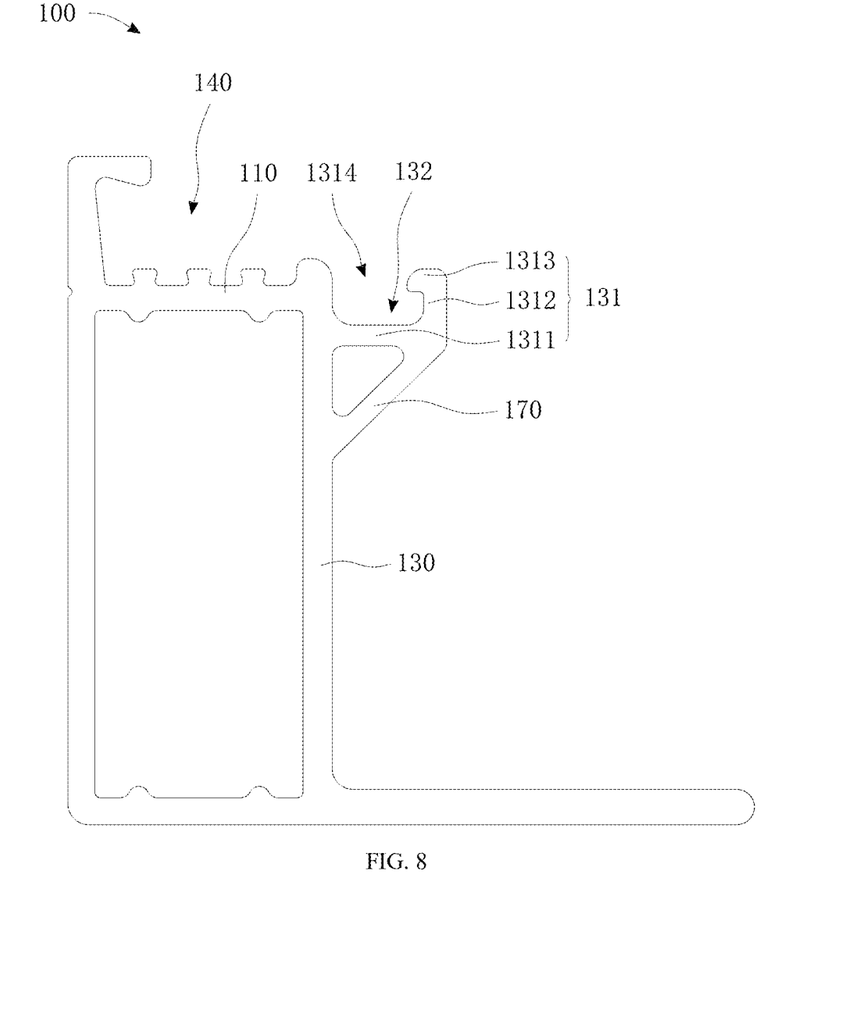
FIG. 8 is a schematic sectional view of a photovoltaic frame according to some embodiments of the present disclosure.

Still referring to FIG. 8, in an embodiment, the glue overflow plate 131 includes a glue holding portion 1311 and a support portion 1312 bent and formed at an end portion of the glue holding portion 1311. A side of the glue holding portion 1311 away from the support portion 1312 is connected to the second side plate 130. That is, one side of the glue holding portion 1311 is connected to the second side plate 130, and the other side of the glue holding portion 1311 is connected to the support portion 1312. The glue holding portion 1311 protrudes towards one side away from the first side plate 120, and the support portion 1312 extends towards the protruding direction of the protruding portion 121. That is, the support portion 1312 may protrude towards the vertical direction or the substantially vertical direction of the paper surface, and the glue holding portion 1311 may be horizontally or obliquely arranged on the second side plate 130. Referring to FIG. 5, an angle between the glue holding portion 1311 and the second side plate 130 is defined as β, and 0<β≤90°. For example, β may be any one of 15°, 30°, 45°, 60°, 75°, and 90°. The specific value of β is not limited herein. The support portion 1312, the second side plate 130, and the glue holding portion 1311 enclose the first glue overflow groove 132, which may be configured to accommodate the adhesive. The first glue overflow groove 132 fitting the glue groove structure 150 can increase a glue holding capacity of the adhesive, thereby improving the gluing strength of the laminate 200 on the photovoltaic frame 100. Moreover, the first glue overflow groove 132 may receive the glue overflowing from the glue groove structure 150, thereby preventing the adhesive from overflowing to the backlight surface 210 of the laminate 200.

Moreover, when the laminate 200 is mounted on the photovoltaic frame 100, the backlight surface 210 of the laminate 200 abuts against an end portion of a side of the support portion 1312 away from the glue holding portion 1311. The support portion 1312 may support the laminate 200 mounted on the photovoltaic frame 100, which can effectively prevent undesirable phenomena such as deformation and even breakage of the photovoltaic frame 100 during long-term fixing of the laminate 200, thereby prolonging the service life of the photovoltaic frame 100.

Further, referring to FIG. 2, FIG. 3, and FIG. 8, the photovoltaic frame 100 further includes a reinforcing plate 170. Two sides of the reinforcing plate 170 are respectively connected to surfaces of the second side plate 130 and the glue holding portion 1311 away from the mounting groove 140, and the reinforcing plate 170 is configured to support the glue overflow plate 131. Generally, in order to increase the glue holding capacity of the first glue overflow groove 132, the glue holding portion 1311 protrudes towards one side away from the first side plate 120 by a greater distance. For example, in this embodiment, referring to FIG. 4, the distance by which the glue holding portion 1311 protrudes towards one side away from the first side plate 120 is defined as H7, and 1 mm≤H7≤20 mm. For example, H7 may be any one of 1 mm, 5 mm, 10 mm, 15 mm, and 20 mm. The specific value of H7 is not limited herein. When the backlight surface 210 of the laminate 200 abuts against an end portion of a side of the support portion 1312 away from the glue holding portion 1311, a force applied by the laminate 200 to the glue overflow plate 131 is relatively large. By providing the reinforcing plate 170, the support strength of the glue overflow plate 131 can be improved, thus preventing undesirable phenomena such as deformation and even breakage of the glue overflow plate 131 during long-term support of the laminate 200, and prolonging the service life of the photovoltaic frame 100.

Moreover, referring to FIG. 2, FIG. 3, and FIG. 8, the glue overflow plate 131 further includes a glue collecting portion 1313. The glue collecting portion 1313 is connected to an end portion of the support portion 1312 away from the glue holding portion 1311, and the glue collecting portion 1313 protrudes in a direction towards one side adjacent to the first side plate 120. A glue passing opening 1314 is provided between the glue collecting portion 1313 and the second side plate 130. The glue passing opening 1314 is in communication with both the first glue overflow groove 132 and the mounting groove 140. When the laminate 200 squeezes the adhesive in the glue groove structure 150 and the first glue overflow groove 132 during the mounting, the adhesive in the glue groove structure 150 may enter the first glue overflow groove 132 through the glue passing opening 1314 for receiving, and the glue collecting portion 1313 may cause the adhesive in the first glue overflow groove 132 to be accommodated in the first glue overflow groove 132 as much as possible, thereby preventing continuous overflowing of the adhesive in the first glue overflow groove 132 to the backlight surface 210 of the laminate 200 during the squeezing.

In an embodiment, referring to FIG. 2, FIG. 3, FIG. 9, and FIG. 10, the photovoltaic frame 100 further includes a limiting plate 160. The limiting plate 160 is provided on an end portion of the photovoltaic frame 100 extending along the length direction. That is, referring to FIG. 2, the limiting plate 160 is arranged on an end portion of the photovoltaic frame 100 extending in a direction perpendicular to the paper surface. The limiting plate 160 has an abutment surface 161, and when the laminate 200 is mounted on the photovoltaic frame 100, two adjacent sidewalls of the laminate 200 are in contact with the protruding portion 121 and the abutment surface 161, respectively.

Figure 9:
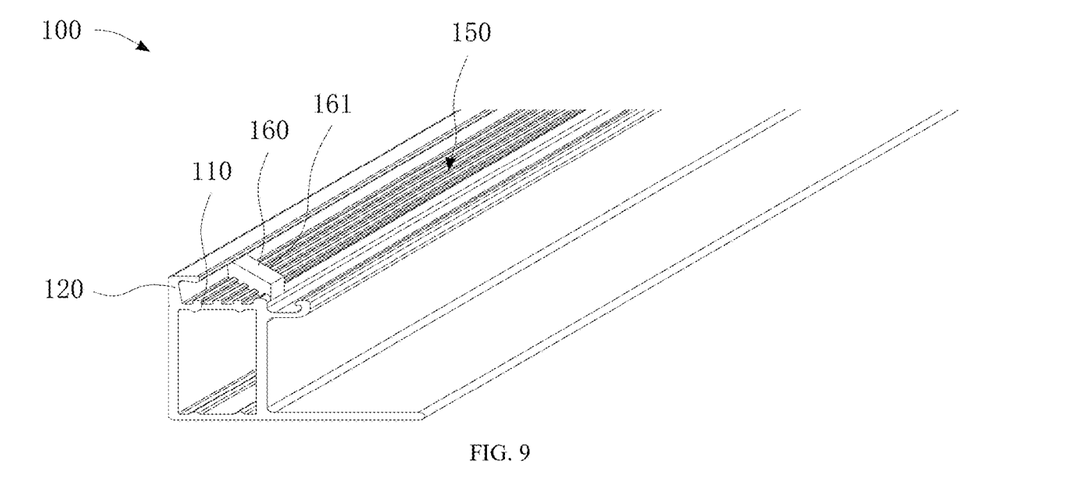
FIG. 9 is a schematic sectional view of a photovoltaic frame according to some embodiments of the present disclosure.
Figure 10:
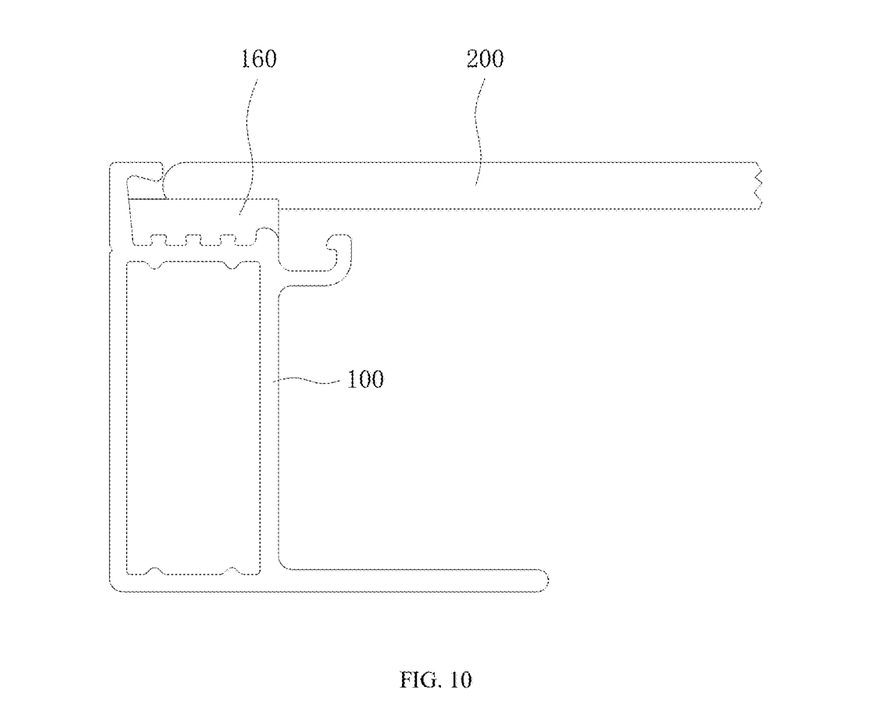
FIG. 10 is a schematic sectional view of a photovoltaic module according to some embodiments of the present disclosure.

During the assembly of the laminate 200 to the photovoltaic frame 100, if a relative position of the laminate 200 and the photovoltaic frame 100 deviates, the laminate 200 may be mounted on the photovoltaic frame 100 in a misaligned manner. Since the laminate 200 is mounted and fixed to the photovoltaic frame 100 by gluing, it is very difficult to adjust the relative position of the laminate 200 and the photovoltaic frame 100. Forcibly adjusting the position of the laminate 200 may easily cause damage to the laminate 200, and may damage an internal structure of the gluing layer 300 and weaken bonding performance of the gluing layer 300. According to the photovoltaic frame 100 in the present disclosure, when there is a need to mount the laminate 200 on the photovoltaic frame 100, two adjacent sidewalls of the laminate 200 are in contact with the protruding portion 121 and the abutment surface 161, respectively, and mounting positions of the laminate 200 and the photovoltaic frame 100 are limited by the limiting plate 160, so as to ensure accuracy of the mounting positions of the laminate 200 and the photovoltaic frame 100.

Further, referring to FIG. 2, FIG. 3, FIG. 9, and FIG. 10, the first side plate 120, the second side plate 130, and the carrying plate 110 are all constructed to extend lengthwise along the length direction of the photovoltaic frame 100. Referring to FIG. 2, the first side plate 120, the second side plate 130, and the carrying plate 110 all extend in a direction perpendicular to the paper surface. In an embodiment, one limiting plate 160 is provided and the limiting plate 160 is provided on one side of the first side plate 120 adjacent to an end portion along an extension direction thereof. For example, the limiting plate 160 is connected to the first side plate 120, and the limiting plate 160 protrudes towards one side accommodated inside the glue groove structure 150. In another embodiment, one limiting plate 160 is provided and the limiting plate 160 is provided on one side of the carrying plate 110 adjacent to an end portion along the extension direction thereof. For example, the limiting plate 160 is connected to the carrying plate 110, and the limiting plate 160 protrudes towards one side accommodated inside the glue groove structure 150. Regardless of the above arrangement manner, since only one limiting plate 160 is provided, the limiting plate 160 is cooperated with the protruding portion 121 to merely limit one corner of the laminate 200, which can ensure accuracy of mounting positions of the laminate 200 and the photovoltaic frame 100 without leading to undesirable phenomena such as jamming of the laminate 200 and unfit with the photovoltaic frame 100 during the mounting. Moreover, the limiting plate 160 is sealed at an end portion of the glue groove structure 150 along the length direction of the photovoltaic frame 100. When the laminate 200 squeezes the adhesive in the glue groove structure 150 during the mounting to cause the adhesive in the glue groove structure 150 to overflow, the limiting plate 160 can prevent the adhesive in the glue groove structure 150 from overflowing from the end portion of the glue groove structure 150 to the outside, thus ensuring that there is sufficient adhesive to glue the laminate 200, which can further improve the gluing strength of the adhesive to the laminate 200 and can ensure appearance performance of the laminate 200 after the mounting.

Specifically, when the laminate 200 is required to be mounted on the photovoltaic frame 100, firstly, the laminate 200 and/or the photovoltaic frame 100 is moved so that the laminate 200 and the photovoltaic frame 100 move towards each other. Then, two adjacent sidewalls of the laminate 200 are respectively in contact with the protruding portion 121 and the abutment surface 161, and the relative position of the laminate 200 and the photovoltaic frame 100 is limited by the first side plate 120 and the limiting plate 160. Finally, after the adhesive is cured to form the gluing layer 300, the laminate 200 is mounted and fixed to the photovoltaic frame 100.

It is to be noted that an angle relationship between the abutment surface 161 of the limiting plate 160 and a surface of a side of the protruding portion 121 adjacent to the glue groove structure 150 may be configured according to an angle relationship between two adjacent sidewalls of the laminate 200. For example, if the two adjacent sidewalls of the laminate 200 are perpendicular to each other, the abutment surface 161 of the limiting plate 160 is also perpendicular to the surface of the side of the protruding portion 121 adjacent to the glue groove structure 150.

In an embodiment, referring to FIG. 2 to FIG. 4, the photovoltaic frame 100 further includes a bottom plate 180, and the bottom plate 180 and the carrying plate 110 extend along a first direction (the direction X shown in FIG. 2 and FIG. 4). The first side plate 120 is connected to the bottom plate 180 and the carrying plate 110, and an end portion of the first side plate 120 protrudes from the carrying plate 110 along the first direction to form the protruding portion 121. The second side plate 130 and the first side plate 120 are arranged at intervals along a second direction (the direction Y shown in FIG. 2 and FIG. 4), and the second side plate 130 is connected between the bottom plate 180 and the carrying plate 110. That is, the bottom plate 180, the carrying plate 110, the first side plate 120, and the second side plate 130 enclose a frame structure. When the laminate 200 is mounted on the photovoltaic frame 100, the carrying plate 110, the first side plate 120, and the second side plate 130 may support the laminate 200, and the bottom plate 180 may be mounted and connected to other structures, so as to connect the laminate 200 to the other structures. The bottom plate 180, the carrying plate 110, the first side plate 120, and the second side plate 130 enclose a cavity 190. Since the bottom plate 180, the carrying plate 110, the first side plate 120, and the second side plate 130 are connected into an entirety through corner fasteners, the cavity 190 can provide an operation space for locking the corner fasteners, thereby facilitating fixed connections among the bottom plate 180, the carrying plate 110, the first side plate 120, and the second side plate 130.

In this embodiment, the first direction and the second direction are perpendicular to each other. In other embodiments, the first direction and the second direction may form other angles.

In addition, referring to FIG. 2 and FIG. 3, an embodiment of the present disclosure further provides a photovoltaic module 400. The photovoltaic module 400 includes a laminate 200 and the photovoltaic frame 100 as described in the above technical solution. The laminate 200 is mounted on the photovoltaic frame 100.

According to the aforementioned photovoltaic module 400, when the laminate 200 is required to be mounted on the photovoltaic frame 100, a preset amount of adhesive can be filled in the glue groove structure 150 and the first glue overflow groove 132, and the laminate 200 is glued and fixed in the mounting groove 140 through the adhesive, thereby achieving fixing and mounting the laminate 200 on the photovoltaic frame 100 to form the photovoltaic module 400. Moreover, the photovoltaic frame 100 in the photovoltaic module 400 may not shield the light-receiving surface 220 of the laminate 200, which prevents undesirable phenomena such as water accumulation and dust accumulation on the light-receiving surface 220 of the laminate 200 and improves the power generation efficiency of the laminate 200.

The technical features of the above-mentioned embodiments can be combined arbitrarily. In order to make the description concise, not all possible combinations of the technical features are described in the embodiments. However, as long as there is no contradiction in the combination of these technical features, the combinations should be considered as in the scope of the specification.

The above embodiments are only several implementations of the present disclosure, and the descriptions are relatively specific and detailed, but they should not be construed as limiting the scope of the present disclosure. It should be understood by those of ordinary skill in the art that various modifications and improvements can be made without departing from the concept of the present disclosure, and all fall within the protection scope of the present disclosure. Therefore, the patent protection of the present disclosure shall be defined by the appended claims.

What is claimed is:

1. A photovoltaic frame, configured to mount a laminate, the photovoltaic frame comprising:
   a carrying plate configured to support a backlight surface of the laminate; and
   a first side plate and a second side plate that are respectively connected to two opposite sides of the carrying plate, wherein the first side plate has a protruding portion protruding from the carrying plate, the protruding portion and the carrying plate enclose a mounting groove configured to accommodate the laminate, the protruding portion and/or the carrying plate is provided with a glue groove structure in communication with the mounting groove, and a side surface of the second side plate away from the first side plate is provided with a glue overflow plate protruding towards a direction away from the first side plate, the glue overflow plate and the second side plate enclose a first glue overflow groove in communication with the mounting groove,
   wherein when the laminate is mounted on the photovoltaic frame, a top end of the protruding portion is lower than or coplanar with a light-receiving surface of the laminate;
   wherein the photovoltaic frame further comprises a limiting plate provided on an end portion of the photovoltaic frame extending along a length direction, wherein the limiting plate has an abutment surface; and when the laminate is mounted on the photovoltaic frame, two adjacent sidewalls of the laminate are in contact with the protruding portion and the abutment surface, respectively;
   wherein the limiting plate is sealed at an end portion of the glue groove structure along the length direction of the photovoltaic frame.

2. The photovoltaic frame of claim 1, wherein the carrying plate has a carrying surface configured to support the laminate;
   wherein an end portion of the protruding portion away from the carrying plate is bent to form a glue blocking plate protruding towards an interior of the mounting groove, the glue blocking plate, the protruding portion, and the carrying plate enclose a second glue overflow groove in communication with the mounting groove, the glue blocking plate has a first end connected to the protruding portion, a second end extending to the interior of the mounting groove, and a transition surface connecting the first end and the second end, the transition surface is an inclined surface or a curved surface and is located on a side of the glue blocking plate adjacent to the carrying plate;
   wherein in a protruding direction of the protruding portion, a distance from a junction of the transition surface and the first end to the carrying surface is H1, a distance from a junction of the transition surface and the second end to the carrying surface is H2, and H1>H2.

3. The photovoltaic frame of claim 2, wherein the protruding portion is provided with at least one first protrusion on a side surface of one side adjacent to the mounting groove, the first protrusion, the glue blocking plate, and the protruding portion enclose the second glue overflow groove; the first protrusion, the carrying plate, and the protruding portion also enclose the second glue overflow groove.

4. The photovoltaic frame of claim 3, wherein the carrying plate is provided with a plurality of second protrusions on an end face of one side adjacent to the mounting groove, two adjacent second protrusions and the carrying plate enclose a third glue overflow groove in communication with the mounting groove.

5. The photovoltaic frame of claim 1, wherein the glue overflow plate comprises a glue holding portion and a support portion bent and formed at an end portion of the glue holding portion, a side of the glue holding portion away from the support portion is connected to the second side plate and protrudes towards one side away from the first side plate, the support portion extends towards a protruding direction of the protruding portion, and the support portion, the second side plate, and the glue holding portion enclose the first glue overflow groove;
   wherein when the laminate is mounted on the photovoltaic frame, the backlight surface of the laminate abuts against an end portion of a side of the support portion away from the glue holding portion.

6. The photovoltaic frame of claim 5, further comprising a reinforcing plate, wherein two sides of the reinforcing plate are respectively connected to surfaces of the second side plate and the glue holding portion away from the mounting groove, so as to support the glue overflow plate.

7. The photovoltaic frame of claim 5, wherein the glue overflow plate further comprises a glue collecting portion connected to an end portion of the support portion away from the glue holding portion, the glue collecting portion protrudes in a direction towards one side adjacent to the first side plate, a glue passing opening is provided between the glue collecting portion and the second side plate, and the glue passing opening is in communication with both the first glue overflow groove and the mounting groove.

8. The photovoltaic frame of claim 1, wherein the first side plate, the second side plate, and the carrying plate extend lengthwise along the length direction of the photovoltaic frame;

wherein the limiting plate is provided on one side of the first side plate adjacent to an end portion along an extension direction thereof, or the limiting plate is provided on one side of the carrying plate adjacent to an end portion along an extension direction thereof.

9. A photovoltaic module, comprising:

the photovoltaic frame of claim 1; and a laminate mounted on the photovoltaic frame.

10. The photovoltaic module of claim 9, wherein the laminate comprises a long side and a short side, and at least one of the long side and the short side is connected to the photovoltaic frame.

\* \* \* \* \*